United States Patent
Samson et al.

(10) Patent No.: US 8,126,510 B1
(45) Date of Patent: Feb. 28, 2012

(54) PUBLIC SAFETY COMMUNICATIONS NETWORK ARCHITECTURE

(75) Inventors: Louis John Samson, Clawson, MI (US); Sunil Dwarka Prasad, Novi, MI (US); Thomas Lawrence Bugg, Jr., Macomb, MI (US)

(73) Assignee: Nextel Communications Inc., Reston, VA (US)

( * ) Notice: Subject to any disclaimer, the term of this patent is extended or adjusted under 35 U.S.C. 154(b) by 1214 days.

(21) Appl. No.: 11/599,697

(22) Filed: Nov. 15, 2006

(51) Int. Cl.
*H04M 1/00* (2006.01)

(52) U.S. Cl. ............. 455/561; 455/500; 455/422.1; 455/404.1; 370/315

(58) Field of Classification Search ............ 455/404.1, 455/500, 561, 562.1, 436–455
See application file for complete search history.

(56) References Cited

U.S. PATENT DOCUMENTS

| | | | |
|---|---|---|---|
| 6,701,156 B2 * | 3/2004 | Akhteruzzaman et al. | 455/521 |
| 6,826,163 B2 * | 11/2004 | Mani et al. | 370/334 |
| 7,224,956 B1 * | 5/2007 | O'Neil | 455/404.1 |
| 2005/0243785 A1 * | 11/2005 | Sabat et al. | 370/338 |
| 2006/0246909 A1 * | 11/2006 | Petermann | 455/444 |
| 2007/0099667 A1 * | 5/2007 | Graham et al. | 455/562.1 |

* cited by examiner

*Primary Examiner* — Vladimir Magloire (57) ABSTRACT

A system and method for providing a communication between public safety officials is disclosed. In a system of the invention, a communications network architecture includes a base transceiver station hub where the base transceiver station hub includes public safety network communications equipment and non-public safety network communications equipment. The architecture also includes a plurality of distributed antenna system (DAS) nodes and the base transceiver station hub is operatively coupled to the plurality of DAS nodes. In a method of the present invention, the method includes providing the public safety communication from the base transceiver station hub to one of a plurality of distributed antenna system (DAS) nodes by public safety network communications equipment included in the base transceiver station hub.

15 Claims, 8 Drawing Sheets

DISTRIBUTED ANTENNA
ARCHITECTURE

*Fig. 4*

DISTRIBUTED ANTENNA
ARCHITECTURE

PUBLIC SAFETY COMMUNICATIONS NETWORK ARCHITECTURE

FIELD OF THE INVENTION

The present invention relates generally to the field of telecommunications, and in particular, to a communications network architecture for supporting public safety communications.

BACKGROUND OF THE INVENTION

The importance of the ability for public safety officials to communicate in public safety emergency situations is becoming increasingly important. These public safety officials may be associated with the fire department, police department, or any other public or private organization that is responsible for providing services related to safety of the public.

Conventionally, separate communications networks, i.e., public safety networks, provide service for these public safety communications. However, as is known from previous emergency situations, interference with communications over the public safety network can be caused by other cellular communications networks, e.g., cell phone networks, operating in the same geographic service area. Thus, due to this interference, critical public safety communications can be disrupted, which seriously degrades the ability of the public safety organization to respond.

Figure 1:
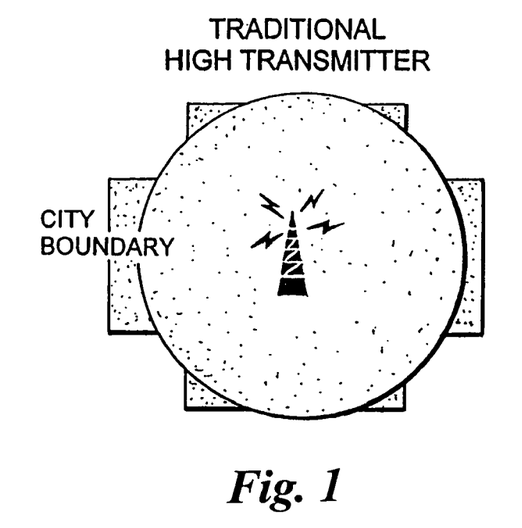
FIG. 1 illustrates a traditional high site transmitter architecture.
Figure 2:
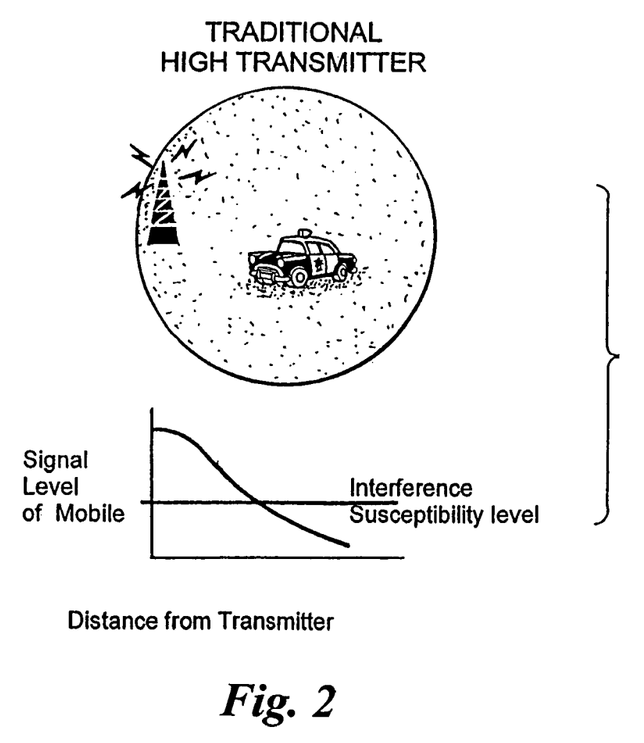
FIG. 2 illustrates the relationship between signal strength and susceptibility to interference based on distance from the transmitter in a traditional high site transmission network.

This interference is generally a result of the use of traditional "high site transmission" communications networks, which are used for both public safety networks and other cellular networks. These traditional "high site transmission" networks are inherently flawed in that the strength of the signal received by a mobile communications device decreases as its distance from the network transmitter increases. Thus, the mobile device is susceptible to interference caused by relatively stronger signals from other carrier networks as it nears its outer-most boundary from the transmitting cell tower. FIGS. 1 and 2 illustrate a traditional high site transmitter architecture and the relationship between signal strength and susceptibility to interference based on distance from the transmitter in the traditional high site transmitter network, respectively.

Figure 3:
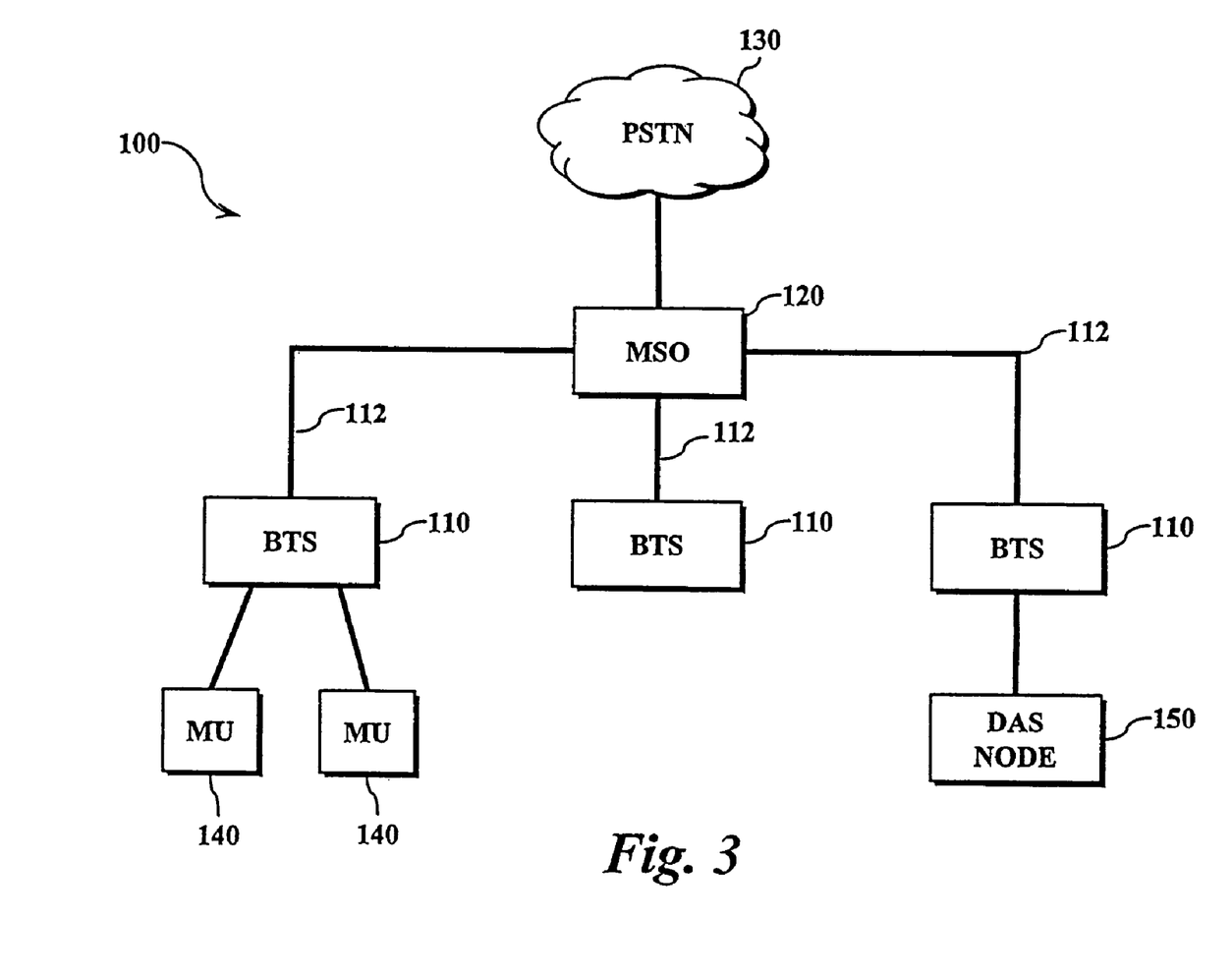
FIG. 3 illustrates a network architecture for a cellular communications network with a distributed antenna system.

In order to attempt to improve interference problems with non-public safety communications networks, fiber optic technology is increasingly being utilized. Optical fiber not only generally has increased transmission capacity over copper wire, but it is also generally more resistant to the effects of electromagnetic interference. FIG. 3 illustrates a network architecture for a cellular communications network 100. As can be seen, the cellular network consists of base transceiver stations (BTS) 110 which are connected to a mobile switching office (MSO) 120. The MSO is generally connected to the Public Switched Telephone Network (PSTN) 130. As is well-known, individual mobile units (MU) 140, which could be the individual subscribers' cell phones, communicate with the BTS when in the "cell" of the BTS.

Figure 4:
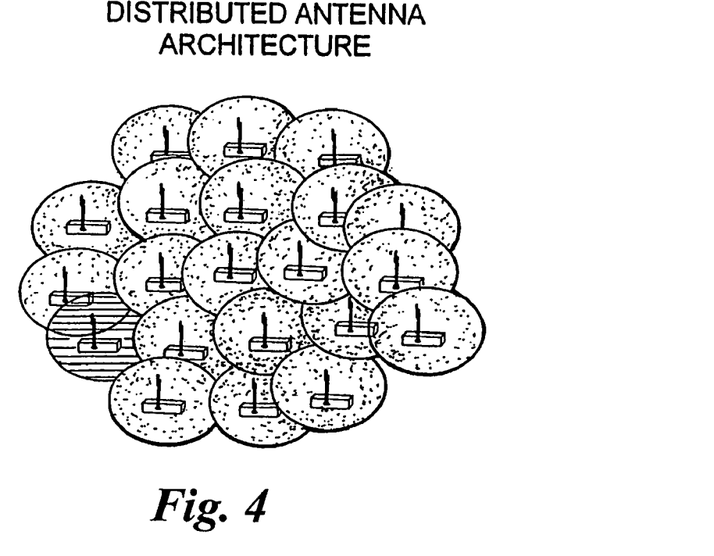
FIG. 4 illustrates the many DAS nodes that may be included in a distributed antenna system architecture.
Figure 5:
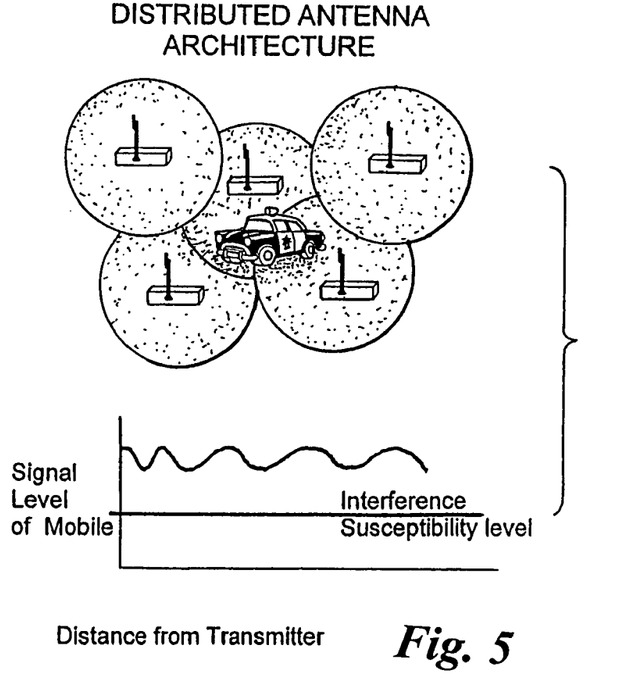
FIG. 5 illustrates the relationship between signal strength and susceptibility to interference in a distributed antenna system architecture.

Also shown in network 100 of FIG. 3 is a remote repeater node 150 that is connected to BTS 110. Repeater node 150 may be an optical repeater that is used in a distributed antenna system (DAS). The DAS node extends the coverage area of a cell. The DAS node is connected to the BTS and may be connected to the BTS by a fiber optic cable. Whereas only one DAS node is illustrated as being attached to one BTS, there may be many DAS nodes attached to a BTS. FIG. 4 illustrates the many DAS nodes that may be included in a distributed antenna system architecture. Thus, as can be seen in FIG. 5, with the DAS architecture, because the optical repeaters are distributed throughout the service area of the cell, the mobile device is not as susceptible to interference since the effective distance of the mobile device from the transmitter is not as great even in the most outer-boundary of the cell.

Whereas non-public safety communications networks may be taking advantage of fiber optics technology and distributed antenna system architectures, public safety networks are still stand-alone networks that utilize traditional "high site transmission" architectures. Therefore, there is a need for an improved architecture for a public safety network that can provide a greater degree of confidence in ensuring communications can be conducted in emergency situations.

SUMMARY OF THE INVENTION

In accordance with a system of the present invention, a communications network architecture is provided. The architecture includes a base transceiver station hub where the base transceiver station hub includes public safety network communications equipment and non-public safety network communications equipment. The architecture also includes a plurality of distributed antenna system (DAS) nodes and the base transceiver station hub is operatively coupled to the plurality of DAS nodes.

In accordance with a method of the present invention, a method of providing a communication between public safety officials is provided. The method includes providing the public safety communication from the base transceiver station hub to one of a plurality of distributed antenna system (DAS) nodes by public safety network communications equipment included in the base transceiver station hub. The base transceiver station hub also includes non-public safety network communications equipment for supporting communications between subscribers to a commercial service provider network.

DETAILED DESCRIPTION OF THE EXEMPLARY EMBODIMENTS

Figure 6:
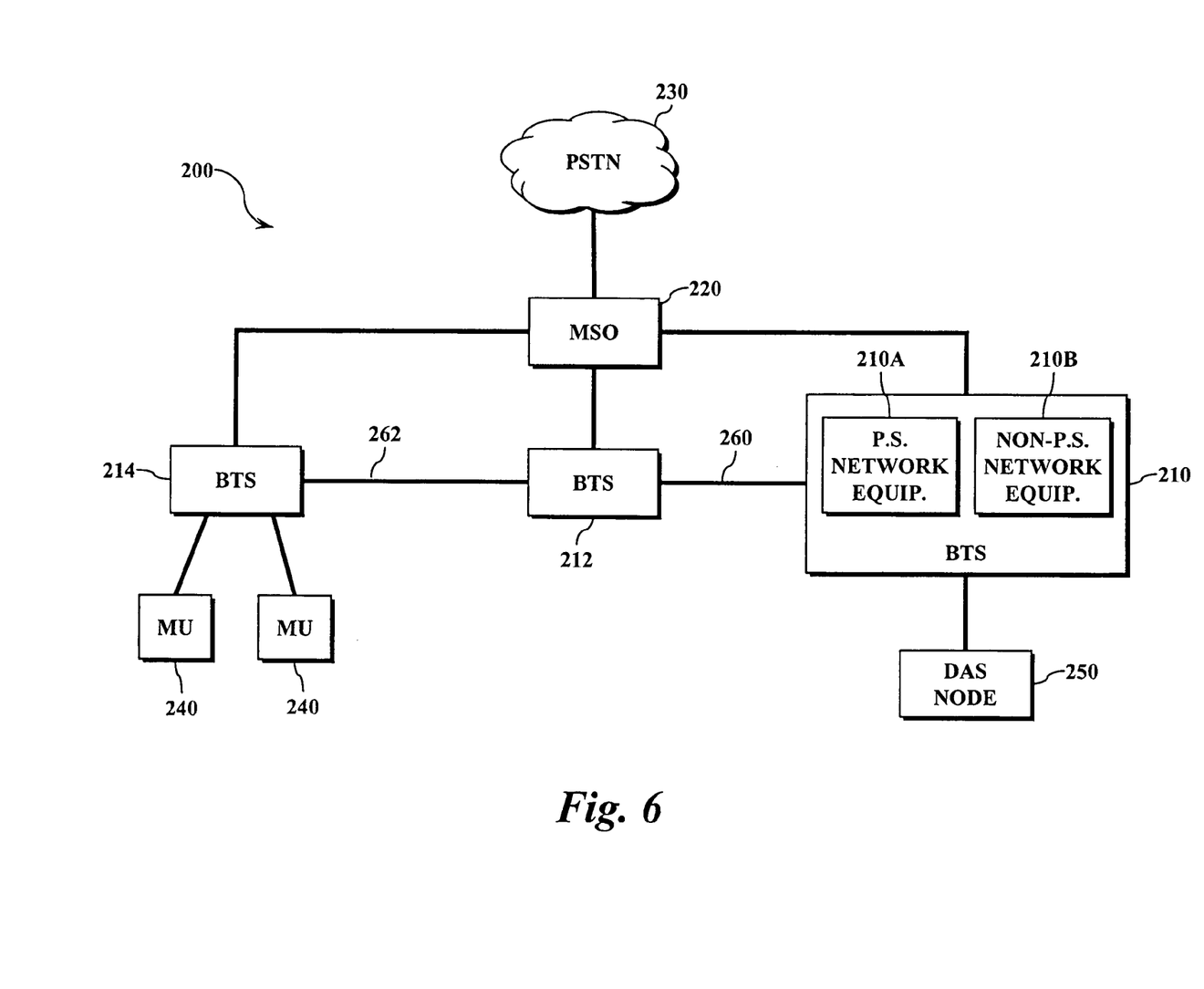
FIG. 6 illustrates a distributed antenna system network architecture for supporting both public safety communications and non-public safety communications in accordance with the principles of the present invention.

FIG. 6 illustrates a network architecture for a cellular communications network 200 in accordance with the principles of the present invention. As can be seen, and as discussed previously above, the network consists of base transceiver stations (BTS) 210-214 which are connected to a mobile switching office (MSO) 220. The MSO is generally connected to the Public Switched Telephone Network (PSTN) 230. As is well-known, individual mobile units (MU) 240, which could be the individual subscribers' cell phones, communicate with the BTS when in the "cell" of the BTS. Whereas only two mobile units 240 are illustrated communicating with BTS 214, and only three BTSs are illustrated, it is understood that multiple mobile units can communicate with each of the illustrated BTSs and any number of BTSs can be incorporated into the network architecture.

Also shown in network 200 of FIG. 6 is a remote repeater node 250 that is connected to BTS 210. Repeater node 250 may be an optical repeater that is used in the distributed antenna system (DAS), as discussed previously. Again, whereas only one DAS node is illustrated as being attached to one BTS, there may be many DAS nodes attached to a BTS. In a cell that utilizes DAS nodes, the mobile units communicate with the BTS hub via a DAS node. Thus, as can be seen in FIG. 5, with the DAS architecture, because the optical repeaters are distributed throughout the service area of the cell, a mobile device is not as susceptible to interference since the effective distance of the mobile device from the transmitter is not as great as with traditional "high site transmission" networks.

In accordance with the principles of the present invention, the BTS(s) each include all of the equipment required to support public safety communications. Thus, the same network and architecture that supports non-public safety communications, e.g., regular cell phone communications of subscribers of a service provider, provides for public safety communications. In this manner, as can be seen in FIG. 6, BTS 210 includes public safety network communications equipment 210A and non-public safety network communications equipment 210B. Whereas BTS 212 and 214 in FIG. 6 are not illustrated as including both public safety network communications equipment and non-public safety network communications equipment, as can be understood, these BTSs, and any other BTSs in the network architecture, can include both of these communications equipments.

The present invention is not limited to any particular types of equipment for the public safety network communications equipment or the non-public safety network communications equipment. All that is required is that the network architecture be able to support these different types of calls from the same BTS and associated DAS nodes. Thus, this equipment can include separate transmitters, receivers, radios, radio frequency (RF) to optical converters, and any other equipment required. However, the separate sets of communications equipments allow for separately providing both commercial communications services to subscribers of the service provider network and communications services to public safety officials. These public safety related communications are provided over a frequency(s) that is not available for use by the commercial subscribers of the service provider. Thus, these public safety communications are provided over a closed network.

The public safety communications can be provided to any of a variety of public safety officials and the present invention is not limited to any particular type of public safety issue. For example, the public safety network communications equipment can support communications between fire department, police department, or any other type of emergency response team or personnel involved in providing public safety services.

As such, in accordance with the principles of the present invention, the present invention is a novel utilization of a distributed fiber optical repeater network distributed antenna system. The invention bundles RF equipment used by public safety networks into the base transceiver stations of fiber optical repeater network distributed antenna systems. As such, the invention minimizes the level of interference caused to public safety workers using cellular and radio devices.

In the present invention, the RF equipment from the public safety network is housed in a base transceiver station with the "interfering" carrier's equipment and the RF signal from the public safety network is then "piggybacked," converted to a light signal, and transmitted over fiber optic cable through the distributed antenna system. As will also be discussed further below, this provides the public safety network with several key advantages: 1) interoperability—the antennas are distributed over large areas and this gives users instant access and wide geographic coverage, and, it is a pre-emptive way for public safety designers to ensure network access; 2) reliability—because the public safety system is tied into the carrier's fiber optical repeater network distributed antenna system, it benefits from the built-in redundancy of the design; 3) fault tolerance—because the system is "tied into" the fiber optical repeater network design, it benefits from optical cross-connect switching, which provides RF redundancy to the network; 4) ubiquitous coverage—multiple antenna locations provide a more consistent signal level across the coverage area; and 5) non-interfering architecture—multiple antenna locations reduce interference because signal strengths across boundaries are similar. Thus, with the present invention, the high site cells on the public safety network experience less interference.

The present invention is not limited to any particular type of communication form for either the public safety communications or the commercial non-public safety communications. The communications can be either dispatch communications or regular cell phone communications. As is known, dispatch communications are generally known as "walkie-talkie" types of calls, such as those provided by Sprint Nextel, and are half-duplex communications where only one party at a time is able to speak. Additionally, because separate network equipment is provided for both the public safety communications and the commercial non-public safety communications in the BTS, these communications serviced by any particular BTS can be different types. For example, the public safety communications can be half-duplex calls and the commercial non-public safety communications can be regular cell phone calls, i.e., full-duplex communications, and/or text messages, etc.

Further in accordance with the principles of the present invention, as will be further discussed below and as illustrated in FIG. 6, in an embodiment of this architecture each BTS hub is connected to the BTS hub(s) that is adjacent to it. This is in contrast to the architecture of FIG. 3 where each BTS is individually connected to the MSO 120 and the BTSs are not connected to each other. In the architecture of FIG. 3, each BTS 110 is connected to MSO 120 by a communications link 112. This communications link may be either a copper cable or a fiber optic cable. However, regardless of how each BTS 110 is connected to the MSO 120, there is no direct connectivity between the BTSs. This can present drawbacks. For example, if the cable between a BTS and the MSO is severed, or if there is an interruption in the service between the BTS and MSO for any reason, the BTS would not be able to provide service to persons in that cell.

In the embodiment of the architecture of FIG. 6, as can be seen and as discussed above, each BTS hub is connected to the BTS hub(s) that is adjacent to it. Thus, BTS 210 is connected to adjacent BTS 212 and BTS 212 is connected to adjacent BTS 214. BTS 210 is connected to BTS 212 by link 260 and BTS 212 is connected to BTS 214 by link 262. The present invention is not limited to any particular embodiment for links 260 and 262. All that is required is that a connection be provided between adjacent BTSs so that any particular BTS can directly communicate with an adjacent BTS. This is one aspect of the invention, as discussed above, which provides one or more of the advantages discussed above.

Figure 7:
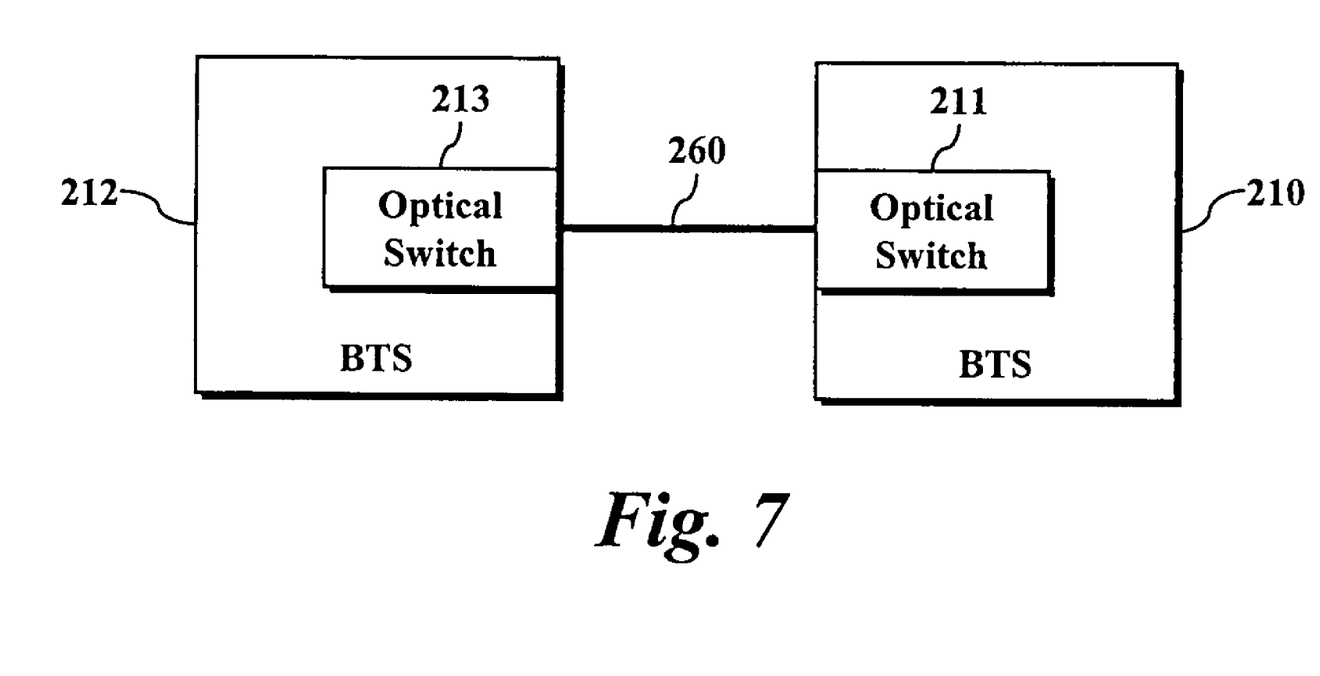
FIG. 7 further illustrates the base transceiver stations of the architecture of FIG. 6.

In an embodiment of the present invention, links 260 and 262 comprise a fiber optic cable. Additionally, as can be seen in FIG. 7, each BTS includes an optical switch. Thus, as shown, BTS 210 includes optical switch 211 and BTS 212 includes optical switch 213. As is known, the optical switches convert electrical signals in the BTS to optical signals. The optical switch of a transmitting BTS converts electrical signals to optical signals and transmits the optical signals to a receiving BTS. The optical switch of a receiving BTS converts the received optical signals from the transmitting BTS to electrical signals. Thus, the optical switch of a BTS transmits optical signals to, and receives optical signals from, an adjacent BTS, if required, over the connecting fiber optic links. In an alternative embodiment, each optical switch both receives and transmits optical signals. Thus, the switch is an all optical switch and there is no conversion of electrical signals to optical signals and vice versa.

The cellular network architecture 200 for the fiber optic repeater distributed antenna system of FIG. 6 has particular utility when one of the links that directly connects a BTS with the MSO is damaged. In this circumstance, as will be further explained below, the fiber optic link between the BTS with the damaged MSO connection and the adjacent BTS, and their associated optical switches, can provide for service in the cell of the BTS with the damaged MSO connection when it otherwise would not have been available. With the present invention, not only are regular non-public safety communications provided to the service provider's subscribers in the cell of the BTS with the damaged MSO connection, but also, because the public safety network also utilizes the architecture, the public safety network is also provided with this built-in redundancy of the network architecture. Thus, public safety communications can also be provided when they otherwise may not have been able to be provided.

Figure 8:
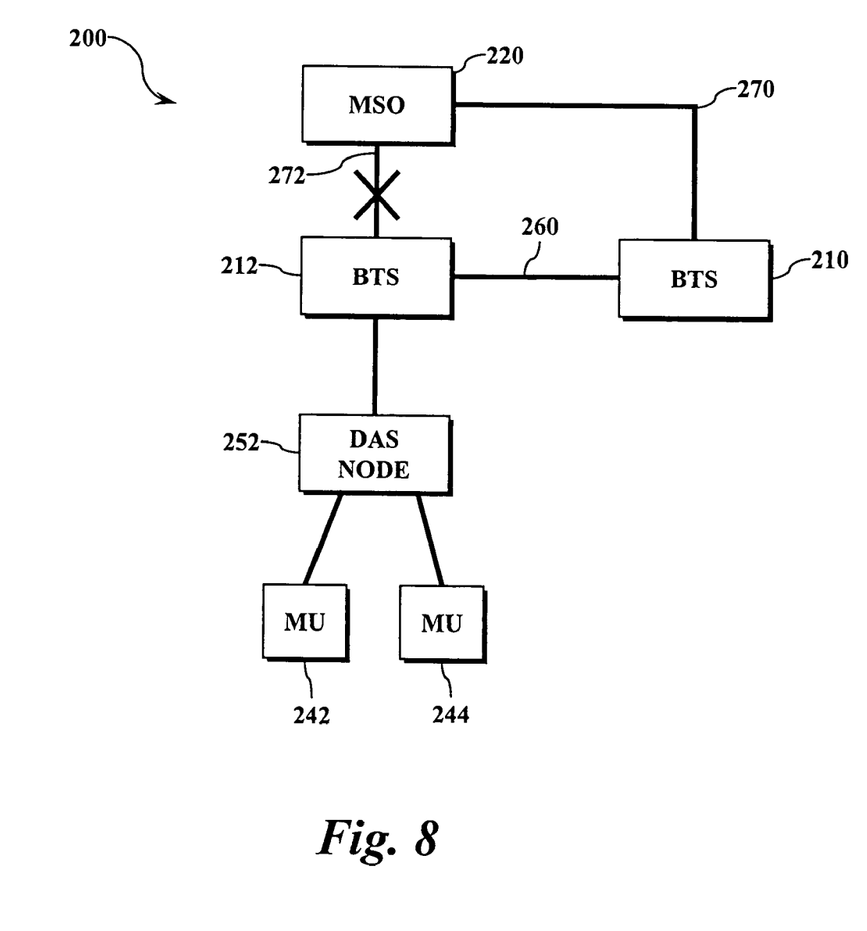
FIG. 8 illustrates the architecture of FIG. 6 with a damaged link between the mobile switching office and a base transceiver station.

As an example of the redundancy of the network, as can be seen in FIG. 8, the link 272 between BTS 212 and MSO 220 has been damaged such that BTS 212 can no longer directly communicate with MSO 220. Whereas the damage in link 272 is illustrated as a physical disconnection in the link, it can be understood that the present invention has utility in any other situation where a BTS is not able to communicate with an MSO. In this circumstance where BTS 212 cannot communicate with MSO 220, in the absence of the present invention, BTS hub 212 could not provide service, whether for public safety or non-public safety communications, to DAS node 252 and other nodes associated with this hub. Thus, no service would be provided to mobile units 242 and 244, for example.

In accordance with the principles of the present invention, in this circumstance where BTS 212 cannot directly communicate with MSO 220, BTS 212 can alternatively communicate with MSO 220 via fiber optic cable 260, BTS 210 and link 270. As can be understood, in the event of a physical break or an outage in service between BTS 212 and MSO 220, the optical switch in BTS 212 detects the flaw and automatically re-routes transmissions back to MSO 220 over fiber link 260 and through BTS 210 and link 270. In turn, MSO 220 routes transmissions to BTS hub 212 via linked BTS hub 210, which backfeeds the transmissions to affected BTS hub 212 via the fiber link 260. This effectively prevents any loss of service to the remote DAS node(s) 252. This architecture takes advantage of the automated fault detection capabilities in optical switches and allows the linked BTS hub to backfeed transmissions to the BTS hub that ordinarily would have been without service. Thus, a redundant network architecture is provided for both public safety and non-public safety communications. This is particularly desirable where the emergency situation itself may in-fact cause the disruption in service between BTS 212 and MSO 220 and public safety communications are required in this emergency situation. In this circumstance where a catastrophic event severs a communications link, the present invention provides redundancy for ensuring that public safety communications can be carried out in the cell where the catastrophic event occurs.

The present invention is not limited to any particular embodiment for the fiber optic cables connecting the adjacent BTSs and the BTSs with the MSO. The cables may include any type of fiber, any number of fibers, and the fibers may be bundled in various numbers in separate buffer cables.

Figure 9:
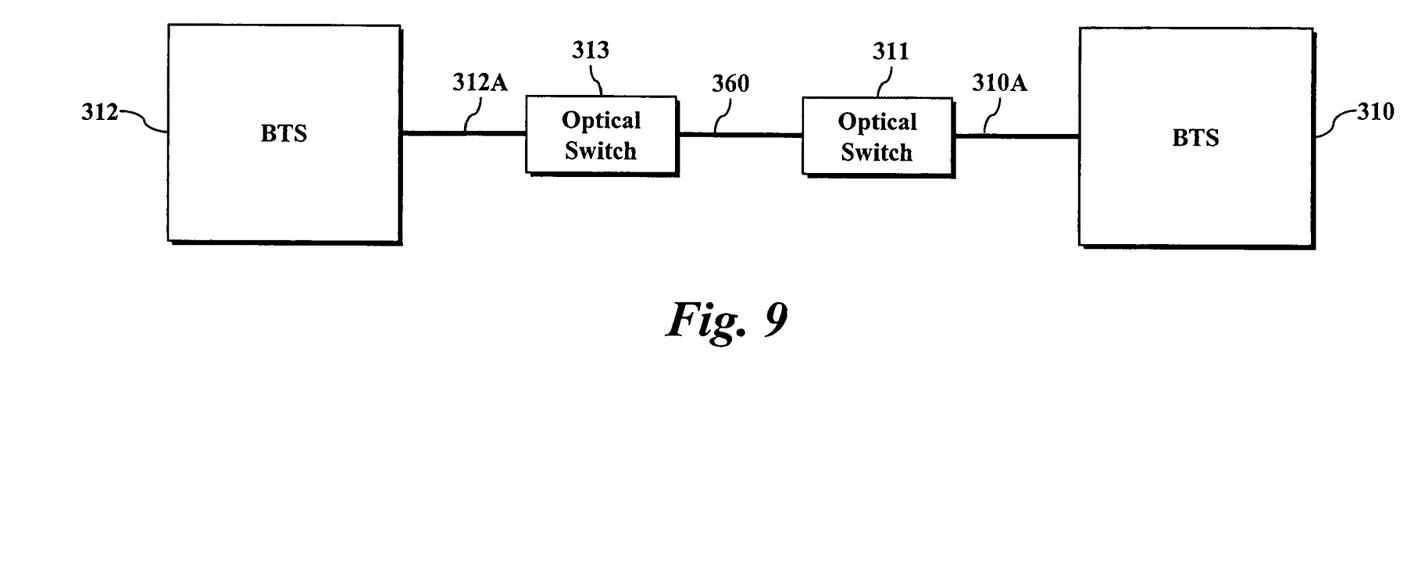
FIG. 9 illustrates an alternative embodiment for the configuration of an optical switch and an associated base transceiver station.

Further in accordance with the principles of the present invention for the architecture of FIG. 6, as illustrated in FIG. 9, the optical switch associated with a respective BTS is not physically co-located with the BTS. Currently, in fiber optical repeater distributed antenna system networks, BTS hub sites are housed in hotel arrangements where the fiber optical switching equipment is co-located with the RF equipment. Thus, in the event that the BTS hub hotel suffers a catastrophic event, both RF and optical switching capabilities are lost.

As will be further discussed below, in accordance with the principles of the present invention, an embodiment of the architecture of the present invention provides particular utility in a circumstance where a BTS is not able to communicate with the MSO because, for example, the BTS hub is destroyed by a catastrophic event such as a fire. Again, this circumstance may be likely in public emergency situations. In this circumstance where the BTS hub is destroyed, as discussed above, if the optical switch is co-located with the BTS, the optical switch would also be destroyed, and thus, communications in the cell would be lost. With the architecture in accordance with the principles of the present invention, physically locating the optical switch separate from the BTS allows the optical switch to remain functioning and further takes advantage of the optical switch's capability for automated sensing and routing, as discussed previously. When the switch loses the transmission from the BTS hub, the optical switch senses the loss and transmissions from the optical switch are re-routed backward to the MSO, which in-turn re-transmits the transmission to the optical switch via its adjacent BTS hub and its associated optical switch. In this architecture, the remote DAS repeaters in communication with the affected optical switch do not lose the signal transmission, and thus, public safety and non-public safety communications are not lost in this cell. Therefore, by linking the optical switches of adjacent BTS hubs and locating the optical switches of the BTS hubs physically separate from the hubs, fiber optical repeater networks can be further hardened with an additional layer of redundancy to provide a variety of services.

Figure 10:
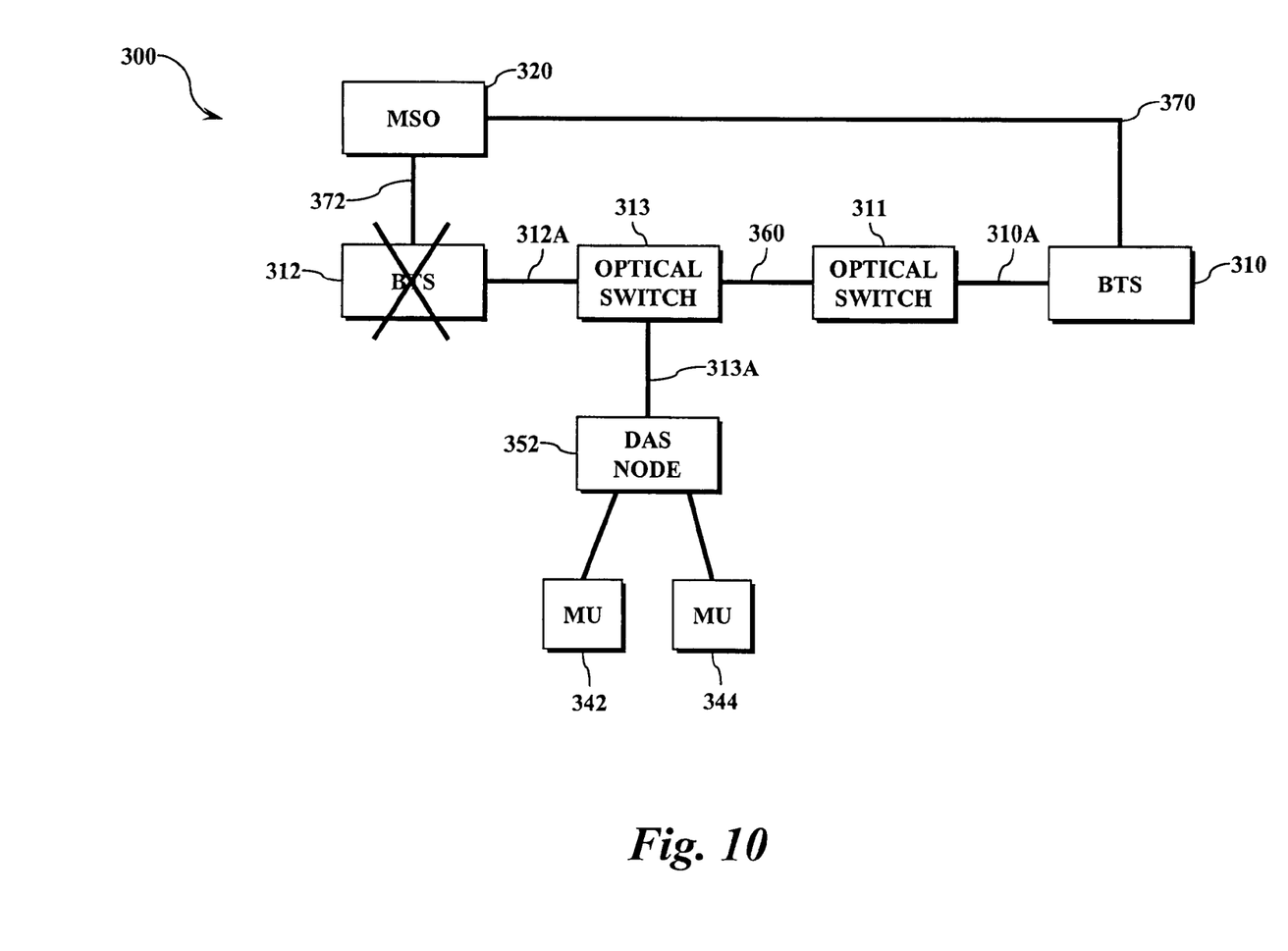
FIG. 10 illustrates a network architecture for the configuration of the optical switch and associated base transceiver station of FIG. 9.

FIG. 10 illustrates an architecture for the configuration of the optical switch and associated base transceiver station of FIG. 9 in the present invention. As can be seen in these Figures, and as discussed previously, optical switch 311 is physically separate from its associated BTS 310 and optical switch 313 is physically separate from its associated BTS 312. In an embodiment, optical switch 311 is in communication with its BTS 310 via an electrical communications link 310A and optical switch 313 is in communication with its BTS 312 via an electrical communications link 312A. Fiber optic communications link 360 couples optical switch 311 to optical switch 313.

Thus, as can be seen in FIG. 10, each optical switch is in communication with its associated BTS and adjacent BTSs are in communication with each other via fiber optic link 360, which couples the optical switches. A difference between this embodiment and the embodiment illustrated in FIG. 7 is the physical separation of the optical switch from its associated BTS. The present invention is not limited to how this physical separation is embodied. For example, the BTS may be housed in a physical enclosure, e.g., terminal building, and the optical switch may be housed in a separate physical enclosure, e.g., a different terminal building. All that is required is that the optical switch be physically located separate from the BTS such that in the event that the BTS suffers a catastrophic physical failure, the optical switch is not affected.

The cellular network architecture 300 for the fiber optical repeater distributed antenna system, as shown in FIG. 10, illustrates the utility of the architecture where the optical switch is physically located separate from its associated BTS. As discussed above, this architecture has particular utility when a particular BTS physically, catastrophically fails or is destroyed, for example, in a public emergency situation. In this circumstance, as will be further explained below, the optical switch of this affected BTS can provide for service for both public safety officials and non-public safety subscribers in the cell of the damaged BTS when it otherwise would not have been available.

As can be seen in FIG. 10, BTS 312 has been rendered physically inoperative such that BTS 312 can no longer communicate with MSO 320. In this circumstance where BTS 312 has been physically damaged, in the absence of the present invention, optical switch 313 would also be physically damaged and service could not be provided to DAS node 352 and other nodes associated with this hub. As can be seen, DAS node 352 is in communication with optical switch 313. Thus, no public safety or non-public safety service would be provided to mobile units 342 and 344, for example. Whereas only one DAS node is illustrated in communication with optical switch 313, it can be understood that many DAS nodes can be in communication with optical switch 313. Also, DAS nodes would also be in communication with optical switch 311 to provide service to mobile units in that cell.

In accordance with the principles of the present invention, in this circumstance where BTS 312 is catastrophically, physically damaged, since optical switch 313 is physically located separate from BTS 312, optical switch 313 is not damaged and can still communicate with DAS node 352. Since communications with MSO 320 through BTS 312 have been lost by optical switch 313, switch 313 can alternatively communicate with MSO 320 via a path that includes fiber optic cable 360, optical switch 311, link 310A, BTS 310 and link 370. As can be understood, in the event of a physical, catastrophic failure of BTS 312, the optical switch 313 associated with BTS 312 is not damaged due to its physical separation from BTS 312 and detects the outage of BTS 312. Switch 313 automatically re-routes transmissions back to MSO 320 over fiber link 360 and through optical switch 311, link 310A, BTS 310 and link 370. In turn, MSO 320 routes transmissions to optical switch 313 via linked BTS hub 310 and its associated optical switch 311, which backfeeds the transmissions to switch 313 via the fiber link 360. This effectively prevents any loss of service to the remote DAS node(s) 352 in the event of a catastrophic failure of BTS 312. This architecture takes further advantage of the automated fault detection capabilities in optical switches and allows the linked BTS hub to backfeed transmissions to the optical switch that ordinarily would have been without service. Thus, a further redundant network architecture is provided.

As with the architecture of FIG. 6, the architecture of FIG. 10 is not limited to any particular embodiment for the fiber optic cables connecting the adjacent BTSs through their respective optical switches, and the BTSs with the MSO. The cables may include any type of fiber, any number of fibers, and the fibers may be bundled in various numbers in separate buffer cables. Also, whereas in an embodiment the communications link between the BTS and its associated optical switch is an electrical communications link, e.g., a conventional T1 line, the present invention is not limited to an electrical link. In an alternative embodiment, similar to the embodiment discussed previously, each optical switch is an all optical switch and there is no conversion of electrical signals to optical signals and vice versa.

Further, whereas the architecture of FIG. 10 is illustrated with an outage of BTS 312, the principles of the present invention can be applied to provide redundancy in this architecture in the event of an outage of any particular BTS hub(s).

The disclosed embodiments are illustrative of the various ways in which the present invention may be practiced. Other embodiments can be implemented by those skilled in the art without departing from the spirit and scope of the present invention.

What is claimed is:

1. A cellular communications network architecture, comprising:
   a first base transceiver station;
   wherein the first base transceiver station includes public safety network communications equipment and non-public safety network communications equipment;
   a plurality of distributed antenna system (DAS) nodes;
   wherein the first base transceiver station is operatively coupled to the plurality of DAS nodes;
   a second base transceiver station, wherein the second base transceiver station includes public safety network communications equipment and non-public safety network communications equipment;
   wherein the public safety network communications equipment included in the first and second base transceiver stations provides communications over a frequency that is not available for use by commercial subscribers using the cellular communications network architecture;
   wherein the first base transceiver station includes a first optical switch and wherein the second base transceiver station includes a second optical switch; and
   a fiber optic communications link coupled between the first optical switch and the second optical switch, wherein the first base transceiver station is in communication with the second base transceiver station via the fiber optic communications link.

2. The cellular communications network architecture of claim 1, wherein the public safety network communications equipment supports communications between public safety officials and wherein the non-public safety network communications equipment supports communications between the commercial subscribers.

3. The cellular communications network architecture of claim 2, wherein the public safety officials are associated with an emergency response team.

4. The cellular communications network architecture of claim 2, further comprising a fiber optic link disposed between the first base transceiver station and the plurality of DAS nodes, and wherein the communications between the public safety officials and the communications between the commercial subscribers are both carried over the fiber optic link.

5. The cellular communications network architecture of claim 1, wherein the plurality of DAS nodes are optical repeaters.

6. The cellular communications network architecture of claim 1, further comprising:
   a mobile switching office;
   wherein the first base transceiver station is in communication with the mobile switching office via a first communications link;
   and wherein the second base transceiver station is in communication with the mobile switching office via a second communications link.

7. The cellular communications network architecture of claim 1, wherein the first optical switch is physically located separate from the first base transceiver station and wherein the second optical switch is physically located separate from the second base transceiver station.

8. The cellular communications network architecture of claim 7, wherein the first optical switch is housed in a first enclosure and the first base transceiver station is housed in a second enclosure, and wherein the second optical switch is housed in a third enclosure and the second base transceiver station is housed in a fourth enclosure.

9. A method of providing a communication between public safety officials, comprising the steps of:
   providing a first public safety communication from a first base transceiver station to one of a first plurality of distributed antenna system (DAS) nodes by public safety network communications equipment included in the first base transceiver station, wherein the first base transceiver station also includes non-public safety network communications equipment for supporting communications between subscribers to a commercial service provider network;
   providing a second public safety communication from a second base transceiver station to one of a second plurality of distributed antenna system (DAS) nodes by public safety network communications equipment included in the second base transceiver station, wherein the second base transceiver station also includes non-public safety network communications equipment for supporting communications between subscribers to the commercial service provider network;
   wherein the public safety network communications equipment included in the first and second base transceiver stations provides communications over a frequency that is not available for use by the subscribers to the commercial service provider network;
   wherein the first base transceiver station includes a first optical switch and wherein the second base transceiver station includes a second optical switch; and
   providing a communication from the first base transceiver station to the second base transceiver station via a fiber optic communications link coupled between the first optical switch and the second optical switch.

10. The method of claim 9, further comprising the step of providing the public safety communication from the one of the first plurality of DAS nodes to a mobile communications unit of a public safety official that is associated with an emergency response team.

11. The method of claim 9, wherein a fiber optic link is disposed between the first base transceiver station and the first plurality of DAS nodes, and wherein the first public safety communication and a communication between the subscribers to the commercial service provider network are both carried over the fiber optic link.

12. The method of claim 9, wherein the first optical switch is physically located separate from the first base transceiver station and wherein the second optical switch is physically located separate from the second base transceiver station.

13. The method of claim 9, wherein the first and second pluralities of DAS nodes are optical repeaters.

14. The method of claim 9, further comprising the step of providing a communication from the non-public safety network communications equipment included in the first base transceiver station to one of the first plurality of distributed antenna system (DAS) nodes.

15. The method of claim 12, wherein the first optical switch is housed in a first enclosure and the first base transceiver station is housed in a second enclosure, and wherein the second optical switch is housed in a third enclosure and the second base transceiver station is housed in a fourth enclosure.

* * * * *